J. W. SMALLMAN.

HAULAGE CLIP.

Reissued June 23, 1914. 13,756.

APPLICATION FILED MAY 25, 1914

3 SHEETS—SHEET 1.

WITNESSES:

Annie P. Smallman

Ethel M. S. Garner.

INVENTOR:

James W. Smallman.

J. W. SMALLMAN.

HAULAGE CLIP.

Reissued June 23, 1914.

APPLICATION FILED MAY 25, 1914

13,756.

3 SHEETS—SHEET 2.

WITNESSES:

Annie C. Smallman.

Ethel M. I. Garner.

INVENTOR:

James W. Smallman.

J. W. SMALLMAN.

HAULAGE CLIP.

APPLICATION FILED MAY 25, 1914.

Reissued June 23, 1914.

13,756.

3 SHEETS—SHEET 3.

WITNESSES:

Annie C. Smallman.

Ethel M. I. Garner.

INVENTOR:

James W. Smallman

UNITED STATES PATENT OFFICE.

JAMES W. SMALLMAN, OF BLACKDOWN, NEAR LEAMINGTON, ENGLAND.

HAULAGE-CLIP.

13,756. Specification of Reissued Letters Patent. Reissued June 23, 1914.

Original No. 1,094,404, dated April 21, 1914, Serial No. 749,143. Application for reissue filed May 25, 1914. Serial No. 840,920.

*To all whom it may concern:*

Be it known that I, JAMES WILLIAM SMALLMAN, a subject of the King of Great Britain and Ireland, of Blackdown, near Leamington, in the county of Warwick, England, have invented an Improved Haulage-Clip, of which the following is a specification.

The accompanying drawings illustrate a haulage clip constructed according to my invention.

Figure 1:
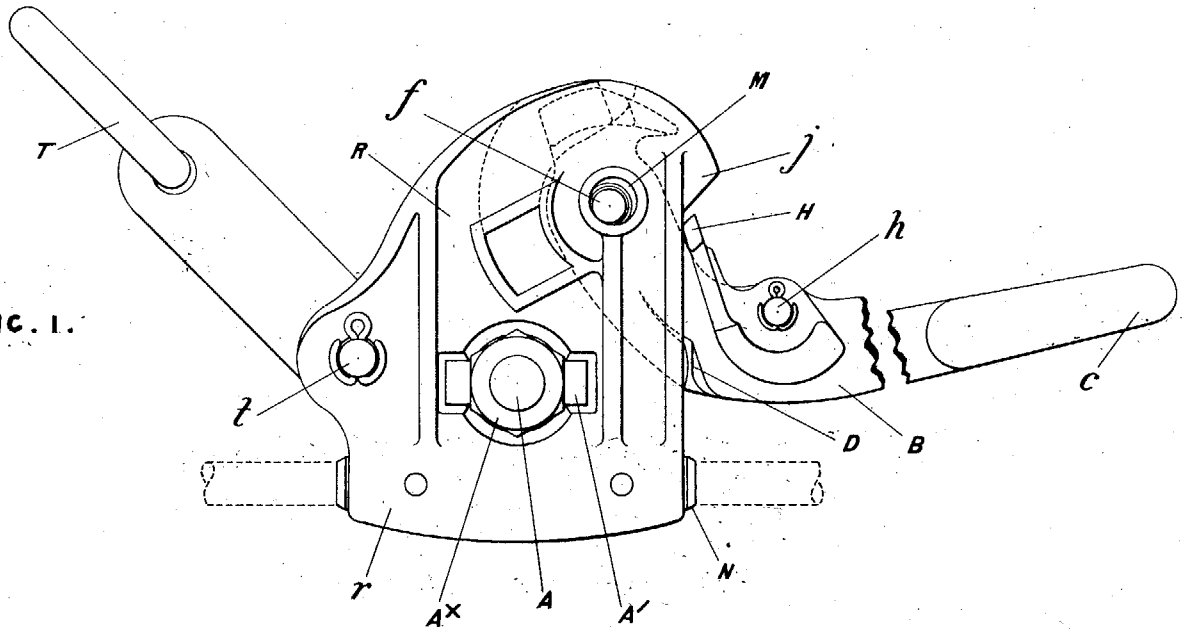
Figure 2:
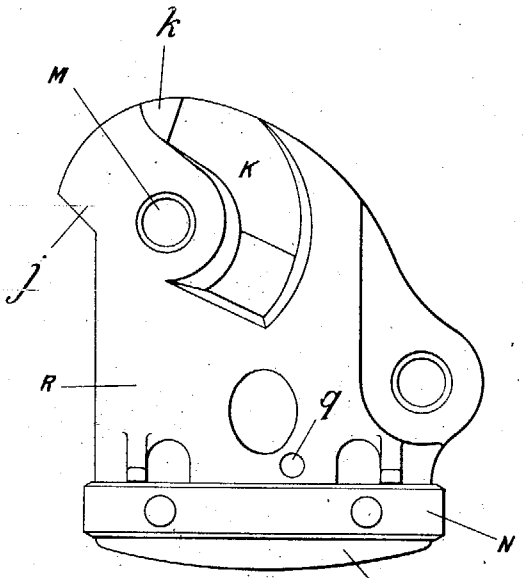
Figure 3:
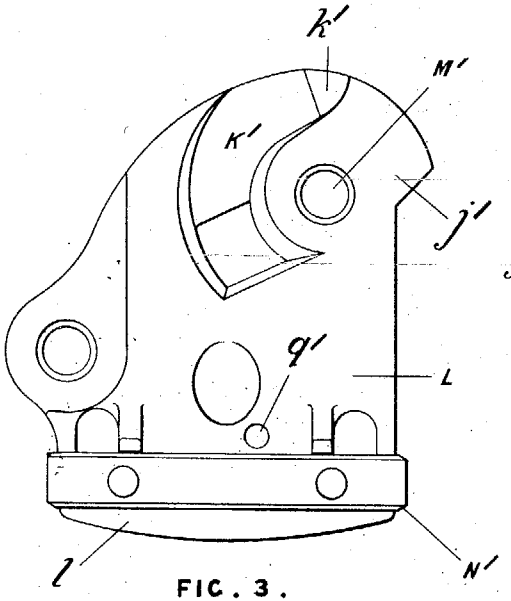
Figure 4:
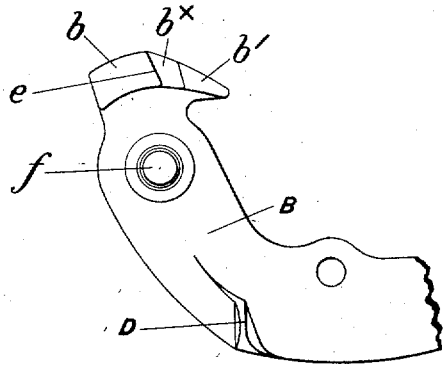
Figure 5:
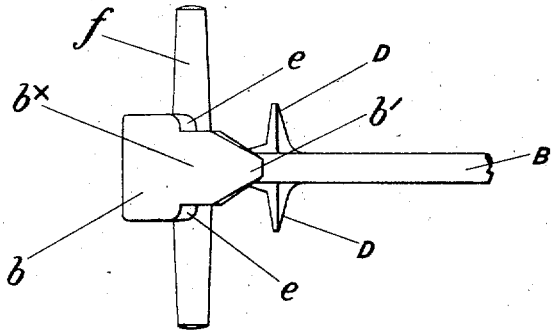
Figure 6:
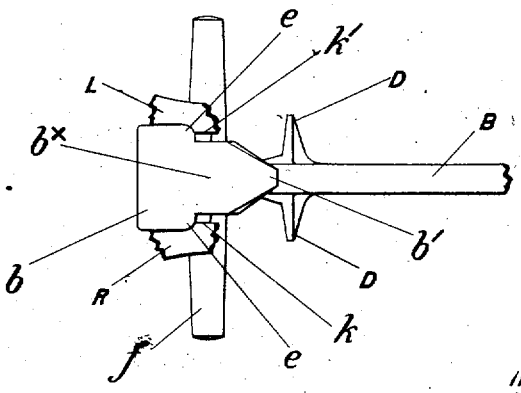

Figure 1 is a side elevation of the improved clip. Fig. 2 shows the inner surface of the right-hand shell. Fig. 3 is a similar view of the left-hand shell. Fig. 4 is a side elevation of the head and body of the lever. Fig. 5 is a corresponding plan. Fig. 6 includes the subsidiary stops.

This invention is a modification of the invention described in the specification to my United States Letters Patent No. 1,077,436, granted Nov. 4, 1913.

In the haulage clip shown by the drawings to that specification, there is only one pair of stops. These stops extend laterally from the body of the lever.

In a haulage clip made in accordance with the present invention, the head of the lever has rounded shoulders and a wedge-like continuation with a reduced base; and there are two pairs of stops—a principal and a subsidiary pair. The principal stops extend laterally from the body of the lever; and the subsidiary stops are at the ends of the inclines on the shells.

When the principal stops bed against the shells below the front projections, the rounded shoulders reach the subsidiary stops; greatly increasing the strength of the construction.

The narrower the subsidiary stops are (and they may be very narrow), the wider the jaws of the shells open.

R is the right-hand shell (looking in the direction in which the rope travels); L being the left-hand shell.

A is the trunnion-bolt, A′ the trunnion-collar and A× the nut of one of the adjustment sets claimed in the specification to my United States Letters Patent No. 728,421, granted 19 May, 1903.

B is the lever.

*b* is the head of the lever, *b′* the wedge-shaped continuation, *b*× the reduced base and *c* the handle.

D are the principal stops extending laterally from the body of the lever; and *e* are the rounded shoulders on the head.

*f* is the trunnion-peg upon which the lever is mounted.

H is the catch that turns on the pin *h*.

*j* and *j′* are the front projections. K and K′ are the inclines.

*k* and *k′* are subsidiary stops at the ends of the inclines.

M and M′ are holes in the shells R and L for the trunnion-peg *f*.

N and N′ are lines riveted in the jaws *r* and *l*.

The recesses *q* and *q′* are for the hooked ends of the spring claimed in the specification to my United States Letters Patent No. 941,049, granted 23 Nov., 1909.

T is a coupling of the ring type secured to the clip by the pin *t*.

The pair of principal stops D, having become firmly bedded against the fronts of the shells R and L, act instead of the trunnion-peg *f* as the fulcrum for the lever B. The rounded shoulders *e* then engage with the subsidiary stops *k* and *k′*. It will be noticed that the trunnion-peg holes M and M′ are comparatively large; enabling the shells R and L to rock with the greatest freedom. Such large holes would, however, allow the lever too much play if there were no subsidiary stops. By holding the head *b*, the subsidiary stops prevent the trunnion-peg *f* moving across the holes M and M′.

In attaching the clip to the rope, the long arm of the lever B is reckoned from the trunnion-peg *f* to the handle *c*; giving the maximum leverage. When the trunnion-peg *f* ceases to act as the fulcrum, the long arm is measured from the stops D to the handle *c*; diminishing the leverage considerably. Owing to the decided change in the leverage, the pressure at the shoulders *e* is extremely slight. It is, therefore, quite unnecessary for the subsidiary stops to be very prominent.

What I claim as my invention and desire to secure by Letters Patent is:—

1. A haulage clip comprising a pair of rocking shells provided with inclines and stops at the ends of the inclines, a central adjustable device for connecting the shells, and a lever pivoted to work between the inclines, the lever having lateral stops on the body and shoulders on the head, the lateral stops bedding against the fronts of the shells and the shoulders against the stops at the ends of the inclines, substantially as set forth.

2. A haulage clip comprising a pair of rocking shells provided with inclines, a central adjustable device for connecting the shells, and a lever mounted on a trunnion-peg to work between the inclines, the movement of the lever being limited by a pair of principal stops below and a pair of subsidiary stops above the trunnion-peg, substantially as described.

3. In a haulage clip, the combination, with a pair of rocking shells having comparatively large trunnion-peg holes and inclines terminated by subsidiary stops, the shells being connected by an adjustable device, of a pivoted lever that has lateral stops on the body and shoulders on the head, the lateral stops bedding against the fronts of the shells and the shoulders against subsidiary stops, substantially as set forth.

4. A haulage clip lever that has lateral stops on the body and shoulders on the head, the lateral stops for bedding against the fronts of a pair of rocking shells and the shoulders for engaging with subsidiary stops at the ends of inclines on the inner surfaces of the pair of rocking shells, substantially as represented.

In testimony whereof I have signed my name to this specification in the presence of two subscribing witnesses.

JAMES W. SMALLMAN.

Witnesses:

ERNEST HARKER,

WILLIAM STEVENS.